(12) United States Patent
Thorburn (10) Patent No.: US 12,384,059 B2
(45) Date of Patent: Aug. 12, 2025

(54) METHOD FOR ASSEMBLING AND/OR DISASSEMBLING ALKALINE ELECTROLYZER UNITS OF A HYDROGEN PRODUCING PLANT

(71) Applicant: ABB Schweiz AG, Baden (CH)

(72) Inventor: Stefan Thorburn, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/718,554

(22) PCT Filed: Dec. 7, 2022

(86) PCT No.: PCT/EP2022/084722
§ 371 (c)(1),
(2) Date: Jun. 11, 2024

(87) PCT Pub. No.: WO2023/110565
PCT Pub. Date: Jun. 22, 2023

(65) Prior Publication Data
US 2024/0417874 A1    Dec. 19, 2024

(30) Foreign Application Priority Data
Dec. 16, 2021    (EP) .................................. 21214977

(51) Int. Cl.
*B25J 19/02*    (2006.01)
*B25J 5/02*    (2006.01)
(Continued)

(52) U.S. Cl.
CPC .............. *B25J 19/02* (2013.01); *B25J 5/02* (2013.01); *B25J 9/00* (2013.01); *C25B 9/75* (2021.01); *C25B 9/77* (2021.01)

(58) Field of Classification Search
CPC .. C25B 15/00; C25B 1/04; C25B 9/75; C25B 9/77; C25B 9/70; B25J 5/02; B25J 9/00; B25J 19/02; Y02E 60/36
See application file for complete search history.

(56) References Cited

U.S. PATENT DOCUMENTS 6,519,837 B1 *    2/2003    Ichikawa .............. B23P 21/004
                                                                                       29/784
2007/0144894 A1    6/2007    Salamanca
(Continued)

FOREIGN PATENT DOCUMENTS

| AU | 2014394044 A1 | 12/2016 |
|---|---|---|
| CN | 104612422 A | 5/2015 |

(Continued)

OTHER PUBLICATIONS

Siemens Energy White Paper, Hydrogen Power Plants Service & Solutions, 2020 (Year: 2020).*
(Continued)

*Primary Examiner* — Jeffrey T Carley
*Assistant Examiner* — Jose K Abraham
(74) *Attorney, Agent, or Firm* — Whitmyer IP Group LLC (57) ABSTRACT

A method for assembling and/or disassembling alkaline electrolyzer units of a hydrogen producing plant. The method includes: providing an industrial robot system including a controller having robot functionality, and a plurality of robots; transporting the plurality of robots to a plurality of electrolyzer unit sites, assembling the alkaline electrolyzer units at the electrolyzer unit sites by the plurality of robots executing assembly instructions included in the controller, and/or disassembling at least one of the alkaline electrolyzer units at an electrolyzer unit site by at least one of the plurality of robots executing disassembly instructions included in the controller.

15 Claims, 5 Drawing Sheets

(51) Int. Cl.
  *B25J 9/00*   (2006.01)
  *C25B 9/75*   (2021.01)
  *C25B 9/77*   (2021.01)

(56) References Cited

U.S. PATENT DOCUMENTS

| | | | | |
|---|---|---|---|---|
| 2009/0301868 A1* | 12/2009 | Swalla | .................. | C25B 1/04 |
| | | | | 29/25.03 |
| 2011/0135429 A1* | 6/2011 | Machida | ............... | B23P 21/004 |
| | | | | 49/507 |
| 2013/0226341 A1 | 8/2013 | Sturm | | |
| 2014/0283357 A1* | 9/2014 | Harada | ................. | B23P 21/004 |
| | | | | 29/430 |
| 2016/0089755 A1* | 3/2016 | Kogushi | .................. | B25J 9/023 |
| | | | | 29/430 |
| 2016/0145749 A1 | 5/2016 | Nigel | | |
| 2017/0022078 A1* | 1/2017 | Fukuoka | .................... | A23L 2/54 |
| 2022/0021290 A1* | 1/2022 | Mills | ...................... | H02K 44/10 |
| 2022/0339598 A1* | 10/2022 | Mueller, III | ........... | B01J 19/249 |

FOREIGN PATENT DOCUMENTS

| | | |
|---|---|---|
| CN | 212834048 U | 3/2021 |
| DE | 102012213421 A1 | 2/2014 |
| JP | H08188235 A | 7/1996 |
| WO | WO-2021048375 A1 * | 3/2021 ............ B01J 19/249 |

OTHER PUBLICATIONS

Anonymous; "Gigastack renewable hydrogen from offshore wind protect advances to next phase; 100MW electrolyzer system"; Green Car Congress: Emissions, Hydrogen, Hydrogen Production, Wind; Feb. 19, 2020; 2 Pages.

Bailey, Mary Page; "Electrolyzer Technologies for Green Hydrogen"; Chemical Engineering, Essentials for the CPI Professional; Sep. 1, 2020; 3 Pages.

Extended European Search Report; Application No. 21214977.7; Completed: Jul. 22, 2022; Issued: Aug. 1, 2022; 7 Pages.

International Preliminary Report on Patentability; Application No. PCT/EP2022/084722; Issued: Feb. 5, 2024; 13 Pages.

International Search Report and Written Opinion of the International Searching Authority; Application No. PCT/EP2022/084722; Completed: May 3, 2023; Mailing Date: May 5, 2023; 12 Pages.

Second International Search Report and Written Opinion of the International Searching Authority; Application No. PCT/EP2022/084722; Issued: Nov. 11, 2023; 6 Pages.

Japanese Office Action; Application No. 2024-534329; Completed: Jan. 9, 2025; Mailing Date: Jan. 21, 2025; 9 Pages.

* cited by examiner

METHOD FOR ASSEMBLING AND/OR DISASSEMBLING ALKALINE ELECTROLYZER UNITS OF A HYDROGEN PRODUCING PLANT

TECHNICAL FIELD

The present invention relates generally to an industrial robot system for assembling and/or disassembling alkaline electrolyzer units of a hydrogen producing plant. The invention more particularly relates to a method for assembling and/or disassembling alkaline electrolyzer units of a hydrogen producing plant and a hydrogen producing plant comprising an industrial robot system.

BACKGROUND

As more countries pursue decarbonization strategies, hydrogen as an energy transporter will most likely become more important. Use of hydrogen is particularly relevant in sectors in which direct electrification is challenging, e.g. in the manufacturing of steel and certain chemicals, in long-haul transport, shipping and aviation. Preferably, the produced hydrogen has low carbon footprint, and is ultimately green, e.g. by being produced by electrolysis of water using electricity from renewable sources. In addition to regulations and market design, the cost of hydrogen production is still a barrier.

Electrolyzers, or water electrolyzers, are electrochemical devices used to split water molecules into hydrogen and oxygen by passage of an electrical current. Electrolyzers comprises electrolyzer cells at which the electrochemical process occurs. An electrolyzer cell is typically composed of two electrodes (anode and cathode) immersed in a liquid electrolyte or adjacent to a solid electrolyte, and a membrane or other porous transport layers which facilitate the transport of reactants and removal of products. At the electrodes, the water is split into oxygen and hydrogen, with ions, typically H+ or OH−, crossing though a liquid or solid membrane electrolyte. The membrane between both electrodes is also responsible for keeping the produced gases (hydrogen and oxygen) separated and avoiding gas mixing.

An electrolyzer typically comprises a plurality of such electrolyzer cells arranged in a cell stack, and arranged between two end plates that provide mechanical support. The cell stack may further include spacers being insulating material between two opposite electrodes in an electrolyzer cell, seals, and frames for further mechanical support. Moreover, a plurality of electrolyzer units can be arranged in an electrolyzer system which include equipment for cooling, processing the hydrogen (e.g. for purity and compression), converting the electricity input (e.g. transformer and rectifier), treating the water supply (e.g. deionization) and gas output (e.g. of oxygen). Such electrolyzer system may e.g. be comprised in a hydrogen producing plant.

Electrolyzers are typically divided into different technologies based on the electrolyte and temperature of operation. For example, alkaline electrolyzers use a liquid alkaline electrolyte, while proton exchange membrane, PEM, electrolyzers uses a solid polymer electrolyte and solid oxide electrolyzers, SOEC, uses a solid ceramic material as the electrolyte.

All types of electrolyzers suffer from relatively high costs for the production of hydrogen. However, alkaline electrolyzers are typically associated with cheaper catalysts with respect to the platinum metal group-based catalysts normally used for PEM. Moreover, alkaline electrolyzers typically have higher durability due to an exchangeable electrolyte and lower dissolution of anodic catalyst. Moreover, alkaline electrolyzers typically achieves a higher gas purity due to lower gas diffusivity in the alkaline electrolyte.

However, there are still challenges associated with electrolyzers, and in particular for hydrogen producing plants comprising a plurality of electrolyzer units. The assembling of the electrolyzer units is time consuming and typically requires heavy lifting equipment and bulky transport facilities. Moreover, disassembling of an electrolyzer unit, e.g. for maintenance, while other electrolyzer units are in operation is challenging due to the dangerous or even hazardous environment for personnel. Moreover, the hydrogen producing capacity per surface area of installation is relatively low, as the electrolyzer units are relatively bulky. Thus, there is a need in the industry for further improvements.

SUMMARY

An object of the present invention is to overcome at least some of the above problems, and to provide improvements in assembling and/or disassembling alkaline electrolyzer units of a hydrogen producing plant. This, and other objectives, which will become apparent in the following are accomplished by means of a method for assembling and/or disassembling alkaline electrolyzer units of a hydrogen producing plant, and industrial robot system for assembling and/or disassembling alkaline electrolyzer units of a hydrogen producing plant, and a hydrogen producing plant comprising such industrial robot system.

According to a first aspect of the present invention, a method for assembling and/or disassembling alkaline electrolyzer units of a hydrogen producing plant, the hydrogen producing plant being housed in a building with a controlled in-house environment, is provided. The method comprises:
 providing an industrial robot system comprising a controller having robot functionality, and a plurality of robots, each robot comprising a manipulator with a base, and a tool movable by means of the manipulator in relation to the base about a plurality of axes,
 transporting the plurality of robots to a plurality of electrolyzer unit sites,
 providing alkaline electrolyzer unit components including at least a plurality of electrolyzer electrodes and a plurality of electrolyzer membranes,
 assembling the alkaline electrolyzer units at the electrolyzer unit sites by the plurality of robots executing assembly instructions comprised in the controller, wherein assembling comprises, for each assembled alkaline electrolyzer unit, arranging the plurality of electrolyzer electrodes and the plurality of electrolyzer membranes in electrolyzer cells forming a cell stack by means of the tool and manipulator of at least one robot, and/or
 disassembling at least one of the alkaline electrolyzer units at an electrolyzer unit site by at least one of the plurality of robots executing disassembly instructions comprised in the controller, wherein disassembling comprises, for each disassembled alkaline electrolyzer unit, removing at least one alkaline electrolyzer unit component by means of the tool and manipulator of at least one robot.

Hereby, an efficient way of assembling and/or disassembling alkaline electrolyzer units of a hydrogen producing plant is provided. Thus, the hydrogen producing plant, or at least a part of the hydrogen producing plant, may efficiently be built up by means of the robot-assisted assembling of alkaline electrolyzer units. Additionally, or alternatively, maintenance or decommissioning may efficiently be achieved by means of the robot-assisted disassembling of the alkaline electrolyzer units. Thus, there is no need for, or at least a reduced need for, manual assembly and/or disassembly of the alkaline electrolyzer units. Hereby, a reduced need for personnel to reside at the electrolyzer unit sites is achieved.

By providing a robot-assisted assembling and/or disassembling of the alkaline electrolyzer units of the hydrogen producing plant as described above, heavy lifting equipment and bulky transport facilities can be dispensed with in the hydrogen producing plant. Moreover, as the assembling and/or disassembling of the alkaline electrolyzer units are performed at the hydrogen producing plant (i.e. on-site), cumbersome transportation can be minimized, as the alkaline electrolyzer unit components can be transported to the hydrogen producing plant instead of already (off-site) assembled alkaline electrolyzer units. Thus, the construction of the hydrogen producing plant is simplified. Moreover, qualification and testing can be simplified as the alkaline electrolyzer units are assembled and/or disassembled on-site instead of off-site. Moreover, by the method of the invention, the hydrogen producing plant can be scaled up or down based on the desired need of overall capacity of the hydrogen producing plant, using the same industrial robot system, the scaling being based on at least the number of alkaline electrolyzer units. The method for assembling and/or disassembling alkaline electrolyzer units of the hydrogen producing plant may be referred to as on-site assembling and/or on-site disassembling alkaline electrolyzer units of the hydrogen producing plant.

Typically, transporting the plurality of robots to a plurality of electrolyzer unit sites, is performed by transporting at least one of the robots to at least one of the electrolyzer unit sites. Thus, different robots of the industrial robot system are transported to different electrolyzer unit sites. However, there is no need to have one robot per electrolyzer unit site, instead the robots can be transported in the building and once the assembling of an alkaline electrolyzer unit is completed by a robot, said robot can be transported to another electrolyzer unit site and assemble another alkaline electrolyzer unit.

According to at least one example embodiment, the building and/or the industrial robot system comprises a guiding system for transporting the plurality of robots to the plurality of electrolyzer unit sites. According to at least one example embodiment, the guiding system is a rail system housed in the building, wherein the plurality or robots is configured to be transported on the rail system. Thus, the plurality of robots is configured to be transported to the plurality of electrolyzer unit sites on the rail system. For example, the rail system is integrated into the floor of the building, e.g. by being divided into different rail portions. According to at least one example embodiment, the guiding system is comprised in the industrial robot system by an autonomous mobile robot functionality. Thus, each one of the plurality of robots is an autonomous mobile robot (AMR) configured to move inside the building by positioning information. According to at least one example embodiment, the controller comprises instructions comprising positioning information for each robot. Thus, each robot is instructed to move (autonomously, or on the rail system) to predetermined positions, typically corresponding to electrolyzer unit sites, for performing assembling and/or disassembling of alkaline electrolyzer units.

It should be noted that an electrolyzer unit site is a site for an alkaline electrolyzer unit, or is an assembly site of an alkaline electrolyzer unit. Thus, the term electrolyzer unit site includes an intended electrolyzer unit site, i.e. a site intended for assembly of an alkaline electrolyzer unit, and includes an actual electrolyzer unit site, i.e. a site having an assembled alkaline electrolyzer unit which e.g. may be at least partly disassembled.

It should be understood that an electrolyzer cell in the cell stack of an alkaline electrolyzer unit typically comprises two electrolyzer electrodes (an anode and a cathode) separated by one electrolyzer membrane. In use, after assembly of the alkaline electrolyzer unit, a liquid alkaline electrolyte solution is provided to the electrolyzer cell (simply referred to as an alkaline electrolyte) to achieve water electrolysis. During operation of the alkaline electrolyzer unit, oxygen gas (and water) is produced at the anode by means of anions of OH, and hydrogen gas (and anions of OH) is produced at the cathode by means of supplied electrons. Alkaline electrolyte and/or water may be continuously supplied to the alkaline electrolyzer unit. The anions of OH is transported from the cathode to the anode via the electrolyzer membrane. Each cell stack of an alkaline electrolyzer unit typically comprises a plurality of such electrolyzer cells. Thus, the assembling typically comprises, for each assembled alkaline electrolyzer unit, arranging a plurality of electrolyzer cells into a cell stack by means of the tool and manipulator of at least one robot.

It should be noted that when stating that the plurality of robots executes assembly instructions comprised in the controller, each one of the plurality robots implement the assembly instructions by at least operating the movable tool and manipulator in response to such assembly instructions.

According to at least one example embodiment, the surface area of the electrolyzer electrodes in the electrolyzer cells in the cell stack in the alkaline electrolyzer units is between 0.5 and 3 m2.

According to at least one example embodiment, during disassembling, removing at least one alkaline electrolyzer unit component by means of the tool and manipulator of at least one robot typically comprises removing electrolyzer cells from the cell stack, and/or removing an electrolyzer electrode or an electrolyzer membrane, by means of the tool and manipulator of at least one robot.

According to at least one example embodiment, the alkaline electrolyzer unit components further include end plates, wherein assembling further comprises, for each assembled alkaline electrolyzer unit, arranging the end plates as a first end plate and a second end plate with the cell stack arranged between the first and second end plates.

Hereby, mechanical support for the cell stack and the alkaline electrolyzer unit is provided. The end plates may be referred to as base plates, or load carrier plates. Thus, the first and second end plates form the main carrier structure for the cell stack of the associated alkaline electrolyzer unit. Typically, the first and second end plates are different to any electrolyzer electrodes of the cell stack. For each assembled alkaline electrolyzer unit, the assembling may comprise arranging the first end plate at a first cell stack end, or an intended first cell stack end by means of the tool and manipulator of at least one robot, and arranging the second end plate at a second cell stack end subsequent to arranging the plurality of electrolyzer electrodes and the plurality of electrolyzer membranes in electrolyzer cells forming the cell stack, by means of the tool and manipulator of at least one robot. According to at least one example embodiment, the alkaline electrolyzer unit components further include intermediate support plates, wherein assembling further comprises, for each assembled alkaline electrolyzer unit, arranging at least one intermediate support plate in between the first end plate and the second end plate with the intermediate support plate encompassing the cell stack arranged between the first and second end plates.

According to at least one example embodiment, the alkaline electrolyzer unit components further include connecting rods, wherein assembling further comprises, for each assembled alkaline electrolyzer unit, arranging at least one connecting rod to extend from the first end plate to the second end plate to compress the electrolyzer cells in the cell stack.

Hereby, further mechanical support for the cell stack and the alkaline electrolyzer unit is provided. The connecting rods may e.g. be attached to each one of the first and second end plates by means of nuts or screw-nuts. For each assembled alkaline electrolyzer unit, the assembling may comprise arranging the at least one connecting rod to extend from the first end plate to the second end plate by means of the tool and manipulator of at least one robot.

According to at least one example embodiment, the alkaline electrolyzer unit components further include piping, wherein assembling further comprises, for each assembled alkaline electrolyzer unit, arranging the piping to transport produced gas from the electrolyzer cells of the cell stack.

Hereby, an efficient way of arranging the piping is provided. Thus, the piping is assembled to be in fluid contact with the cell stack of each alkaline electrolyzer unit, and is configured to transport produced gas from the electrolyzer cells. For example, at least two alkaline electrolyzer units may be configured to provide the produced gas to the same piping. The piping may comprise a first piping system for handling the produced hydrogen gas, and a second piping system for handling the produced oxygen gas, the second piping system being separated and different to the first piping system. According to at least one example embodiment, the piping is further configured to transport the alkaline electrolyte (or corresponding solution thereof) and/or water to, and from, the associated alkaline electrolyzer unit(s). Thus, the piping may comprise a third piping system for handling the alkaline electrolyte and/or water. Typically, the alkaline electrolyte and/or water, is re-circulated out and in of the cell stack(s). For each assembled alkaline electrolyzer unit, the assembling may comprise arranging the piping to extend from cell stack to transport produced gas from the electrolyzer cells, by means of the tool and manipulator of at least one robot. The piping typically includes appropriate valves and pumps. Thus, the assembling may further comprise installing, and/or operating such valves and pumps.

According to at least one example embodiment, the alkaline electrolyzer unit components further include electric wiring, wherein assembling further comprises, for each assembled alkaline electrolyzer unit, arranging the electric wiring to supply at least a part of the alkaline electrolyzer unit with electricity or electrons. The alkaline electrolyzer unit components may further include breakers, disconnectors, and grounding devices.

According to at least one example embodiment, the method further comprises providing the plurality of electrolyzer unit sites in a plurality of rows wherein two neighbouring rows are separated by a row space.

Hereby, the row space can be kept at a minimum, as only the robot configured to operate on the alkaline electrolyzer units need to fit in between two neighbouring rows. For example, the row space is the same as the width of an alkaline electrolyzer unit. According to at least one example embodiment, the row space is smaller than twice the width of an alkaline electrolyzer unit. The width of an alkaline electrolyzer unit is typically defined as the distance in the horizontal plane perpendicular to the centre axis of the alkaline electrolyzer unit. According to at least one example embodiment, the row space is between 1 m and 5 m, such as e.g. 1.5 m and 3 m. For example, and IRB 660 Robot from ABB, being an example robot of the present invention, with a handling capacity of 250 kg require a row space of approximately 1.5 m in order to be able to operate on the alkaline electrolyzer units in the two neighbouring rows. According to at least one example embodiment, the row space is adapted such that a robot operating in between two neighbouring rows, can operate (assemble and/or disassemble) alkaline electrolyzer units in both of the two neighbouring rows. Typically, this may be carried out without changing the position of the robot. For embodiments in which the guidance system is a rail system, two neighbouring rows are typically separated by a rail portion of the rail system. Thus, the plurality of robots can move along a rail portion between two neighbouring rows, and also move to another rail portion separating two other neighbouring rows.

According to at least one example embodiment, a first robot is positioned in between a first row and a second row, wherein assembling comprises assembling a first alkaline electrolyzer unit in the first row, and assembling a second alkaline electrolyzer unit in the second row by the first robot.

That is, the first robot is configured to assemble at least a first alkaline electrolyzer unit in the first row, and also, to assemble at least a second alkaline electrolyzer unit in the second row. The first row and the second row are neighbouring rows. That is, the robot can simply rotate, typically 180 degrees, between a first position in which the robot operates on the first alkaline electrolyzer in the first row, and a second position in which the robot operates on the second alkaline electrolyzer in the second row.

According to at least one example embodiment, the assembling comprises, for each robot, moving the manipulator to a local storage position of the alkaline electrolyzer unit components, picking up an alkaline electrolyzer unit component using the tool, moving the manipulator with the tool holding the picked-up alkaline electrolyzer unit component to an installation position of the associated electrolyzer unit site, assemble the alkaline electrolyzer unit component for the associated alkaline electrolyzer unit.

Hereby, an efficient way of assembling a particular alkaline electrolyzer unit at the associated electrolyzer unit site by using at least one robot is provided. For example, for a first alkaline electrolyzer unit, the local storage position is a first local storage position for the alkaline electrolyzer unit components of at least the first alkaline electrolyzer unit.

According to at least one example embodiment, the disassembling comprises, for each robot, moving the manipulator to the associated alkaline electrolyzer unit, picking up an alkaline electrolyzer unit component using the tool, moving the manipulator with the tool holding the picked-up alkaline electrolyzer unit component to a local storage position of the alkaline electrolyzer unit components, releasing the alkaline electrolyzer unit component at the local storage position of the alkaline electrolyzer unit components.

Hereby, an efficient way of disassembling a particular alkaline electrolyzer unit at the associated electrolyzer unit site by using at least one robot is provided. The disassembling may e.g. be comprised in the action of performing maintenance on the particular alkaline electrolyzer unit. For example, for a second alkaline electrolyzer unit, the local storage position of the (removed or disassembled) alkaline electrolyzer unit components from the second alkaline electrolyzer unit may be the same, or be different to, the first local storage position described above.

According to at least one example embodiment, the method further comprises providing a gas sensor configured to detect any leaking gas from the alkaline electrolyzer units.

Thus, an efficient means for detecting leaking gas is provided. The gas sensor is typically configured to detect hydrogen gas and/or oxygen gas. The gas sensor may e.g. be comprised in at least one robot of the industrial robot system. Preferably, each robot of the industrial robot system comprises such gas sensor.

According to at least one example embodiment, the method further comprises:
  operating a first robot of the plurality of robots with a primary robot functionality by the controller, the primary robot functionality including control of manipulator motion,
  operating a second robot of the plurality of robots with the primary robot functionality by the controller such that the first and second robots are operated by a collaborative motion of the first and second manipulators to collaboratively perform assembling and/or disassembling of a particular alkaline electrolyzer unit.

Hereby, at least two robots may collaborate in the assembling and/or disassembling of a particular alkaline electrolyzer unit. Hereby, the industrial robot system forms a multiple robot motion system.

According to at least one example embodiment, the method further comprises:
  operating the first and second robots by synchronized motion of the first and second manipulators.

Hereby, at least two robots may collaborate in synchronized motion for the assembling and/or disassembling of a particular alkaline electrolyzer unit.

It should be understood the controller of the industrial robot system may comprise a primary controller for each one of the robots. Each primary controller may e.g. be integrated into its corresponding robot. The controller may furthermore comprise secondary controller, such as cell controller or system controllers. Preferably, at least the primary robot functionality such as control of manipulator motion is included in the primary controllers. Any other possible functionalities of the robots, and/or the process (e.g. the process of collaboratively performing assembling and/or disassembling, e.g. by synchronized motion) may preferably be allocated to the secondary controllers. The controller(s) (primary and/or secondary) typically comprises process software and hardware resources to carry out the robot functionality. The process software and hardware resources may e.g. be embodied by a computer and logic unit in the controller(s).

According to at least one example embodiment, the method further comprises transporting the alkaline electrolyzer unit components to, or from, the plurality of electrolyzer unit sites.

Hereby, an efficient way of providing the alkaline electrolyzer unit components to the plurality of electrolyzer unit sites is provided. For example, the alkaline electrolyzer unit components are transported to and/or from the local storage positions as previously described. For example, the alkaline electrolyzer unit components are transported on the rail system, e.g. by the plurality of robots.

According to at least one example embodiment, the controlled in-house environment is a classified area by IEC/EN 60079-10, IEC 60079-10-1, IEC 60079-10-2, or IECEx.

That is, the controlled in-house environment may be dangerous or even hazardous for personnel. Typically, the hydrogen gas, and the risk of any leakage thereof, is the main concern. However, also the very high DC currents creating high magnetic fields should be considered. For example, the controlled in-house environment is a classified as hazardous area Zone 1 or Zone 21 ATEX, IECEx.

According to at least one example embodiment, the plurality of robots is classified to operate in the classified area e.g. by being explosion protected Ex i/Ex p/Ex c for installation in hazardous area Zone 1 or Zone 21 ATEX, IECEx.

According to at least one example embodiment, the controlled in-house environment is a cleanroom. The cleanroom is an engineered space which maintains a very low concentration of airborne particulates. Typically, the cleanroom is well isolated, well-controlled from contamination, and actively cleansed. The cleanroom may e.g. be configured to keep dust, airborne organisms, and/or vaporised particles, at a reduced level compared to the surroundings (e.g. compared to outside of the cleanroom).

The cleanroom may e.g. be configured to achieve a cleanliness level quantified by the number of particles per cubic meter at a predetermined molecule measure. For example, the cleanroom has a cleanliness level corresponding to ISO 14644-1 level 1, level 2, level 3, level 4, level 5, level 6, level 7, or level 8. For example, the number of particles per cubic meter at the predetermined molecule measure corresponds to less than 3520000 particles over 0.5 µm, or less than 352000 particles over 0.5 µm, or less than 35200 particles over 0.5 µm, or less than 3520 particles over 0.5 µm, or less than less than 352 particles over 0.5 µm, or less than 35 particles over 0.5 µm.

According to at least one example embodiment, the disassembling at least one of the alkaline electrolyzer units at an electrolyzer unit site by at least one of the plurality of robots is performed while a plurality of other alkaline electrolyzer units is operating in the hydrogen producing plant. Thus, disassembling, e.g. for maintenance, may be performed during operation of the hydrogen producing plant.

According to at least one example embodiment, at least one of the alkaline electrolyzer unit components comprises a load bearing surface, and wherein assembling further comprises, for at least each one a sub-portion of the assembled alkaline electrolyzer units, arranging the load bearing surface between a bottom alkaline electrolyzer unit and a top alkaline electrolyzer unit such that the top alkaline electrolyzer unit is arranged vertically above the bottom alkaline electrolyzer unit and is supported by the load bearing surface.

Hereby, surface area for the installation of the alkaline electrolyzer units is used more efficient. Stated differently, by using the same amount of surface area for the installation of the alkaline electrolyzer units, the capacity of the hydrogen producing plant is increased. Thus, by this embodiment, the capacity of the alkaline electrolyzer unit per surface area is increased. The capacity may e.g. be defined as the hydrogen producing capacity.

It should be understood that when stating that the top alkaline electrolyzer unit is arranged vertically above the bottom alkaline electrolyzer unit and is supported by the load bearing surface, the top alkaline electrolyzer unit is arranged on top of the bottom alkaline electrolyzer unit, with the load bearing surface arranged in between the bottom and top alkaline electrolyzer units. Thus, the sub-portion of the assembled alkaline electrolyzer units may contain alkaline electrolyzer units arranged on the ground surface, i.e. a plurality of bottom alkaline electrolyzer units. Each bottom alkaline electrolyzer unit may thus have a top alkaline electrolyzer unit arranged on top of the corresponding bottom alkaline electrolyzer unit, with the load bearing surface arranged in between the bottom and top alkaline electrolyzer units.

According to a second aspect of the present invention, an industrial robot system for assembling and/or disassembling alkaline electrolyzer units of a hydrogen producing plant is provided. The alkaline electrolyzer units comprises alkaline electrolyzer unit components including at least a plurality of electrolyzer electrodes and a plurality of electrolyzer membranes, and the hydrogen producing plant is housed in a building with a controlled in-house environment. The industrial robot system comprises:

a controller having robot functionality, and
a plurality of robots, each robot comprising a manipulator with a base, and a tool movable by means of the manipulator in relation to the base about a plurality of axes, the plurality of robots being configured to be transported to a plurality of electrolyzer unit sites,
wherein the plurality of robots is configured to assemble the alkaline electrolyzer units at the electrolyzer unit sites by executing assembly instructions comprised in the controller, such that, for each assembled alkaline electrolyzer unit, the plurality of electrolyzer electrodes and the plurality of electrolyzer membranes are arranged in electrolyzer cells forming a cell stack by using the tool and manipulator of at least one robot, and/or
wherein the plurality of robots is configured to, by means of the tools and manipulators, disassemble the alkaline electrolyzer units at the electrolyzer unit sites by executing disassembly instructions comprised in the controller, such that, for each disassembled alkaline electrolyzer unit, at least one alkaline electrolyzer unit component is removed by using the tool and manipulator of at least one robot.

Effects and features of the second aspect of the invention are largely analogous to those described above in connection with the first aspect of the invention, at least with reference to the industrial robot system. Embodiments mentioned in relation to the first aspect of the invention are largely compatible with the second aspect of the invention, of which some are exemplified below.

Thus, and according to at least one example embodiment, the plurality of robots is classified to operate in the classified area e.g. by being explosion protected Ex i/Ex p/Ex c for installation in hazardous area Zone 1 or Zone 21 ATEX, IECEx.

According to a third aspect of the present invention, a hydrogen producing plant is provided. The hydrogen producing plant comprises a building with a controlled in-house environment, and the industrial robot system according to the second aspect of the invention.

Effects and features of the third aspect of the invention are largely analogous to those described above in connection with the first and second aspects of the invention, at least with reference to the industrial robot system. Embodiments mentioned in relation to the first and second aspects of the invention are largely compatible with the third aspect of the invention, of which some are exemplified below.

In particular, and according to at least one example embodiment, the controlled in-house environment is a classified area by IEC/EN 60079-10, IEC 60079-10-1, IEC 60079-10-2, or IECEx. That is, the controlled in-house environment may be dangerous or even hazardous for personnel. Typically, the hydrogen gas, and the risk of any leakage thereof, is the main concern. For example, the controlled in-house environment is a classified as hazardous area Zone 1 or Zone 21 ATEX, IECEx.

In particular, and according to at least one example embodiment, the controlled in-house environment is a cleanroom. Thus, the hydrogen producing plant may be configured to provide the in-house environment as a cleanroom described with reference to the first aspect of the invention.

According to at least one example embodiment, applicable to both the second and third aspects of the invention, the building and/or the industrial robot system comprises a guiding system for transporting the plurality of robots to the plurality of electrolyzer unit sites. According to at least one example embodiment, the guiding system is a rail system housed in the building, wherein the plurality or robots is configured to be transported on the rail system. Thus, the plurality of robots is configured to be transported to the plurality of electrolyzer unit sites on the rail system. For example, the rail system is integrated into the floor of the building, e.g. by being divided into different rail portions. According to at least one example embodiment, the guiding system is comprised in the industrial robot system by an autonomous mobile robot functionality. Thus, each one of the plurality of robots is an autonomous mobile robot (AMR) configured to move inside the building by positioning information.

For example, a single alkaline electrolyzer unit may have the capacity corresponding to a few MW electricity demand, typically requiring the energy input of 4-5 kWh per produced Nm3 H2 (Normal Cubic meter). For example, the hydrogen producing plant may comprise between 50 and 150 alkaline electrolyzer units, corresponding to an electricity demand of 1 GW.

Any standard or qualifications mentioned in the present application are to be based on instructions valid on the date of priority of the present application. Further advantages and features of the present invention are disclosed and discussed in the following description and the accompanying drawings.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well-known units, devices or systems, electrolyzer cells, and methods are omitted so as not to obscure the description of the present invention with unnecessary detail.

Figure 1:
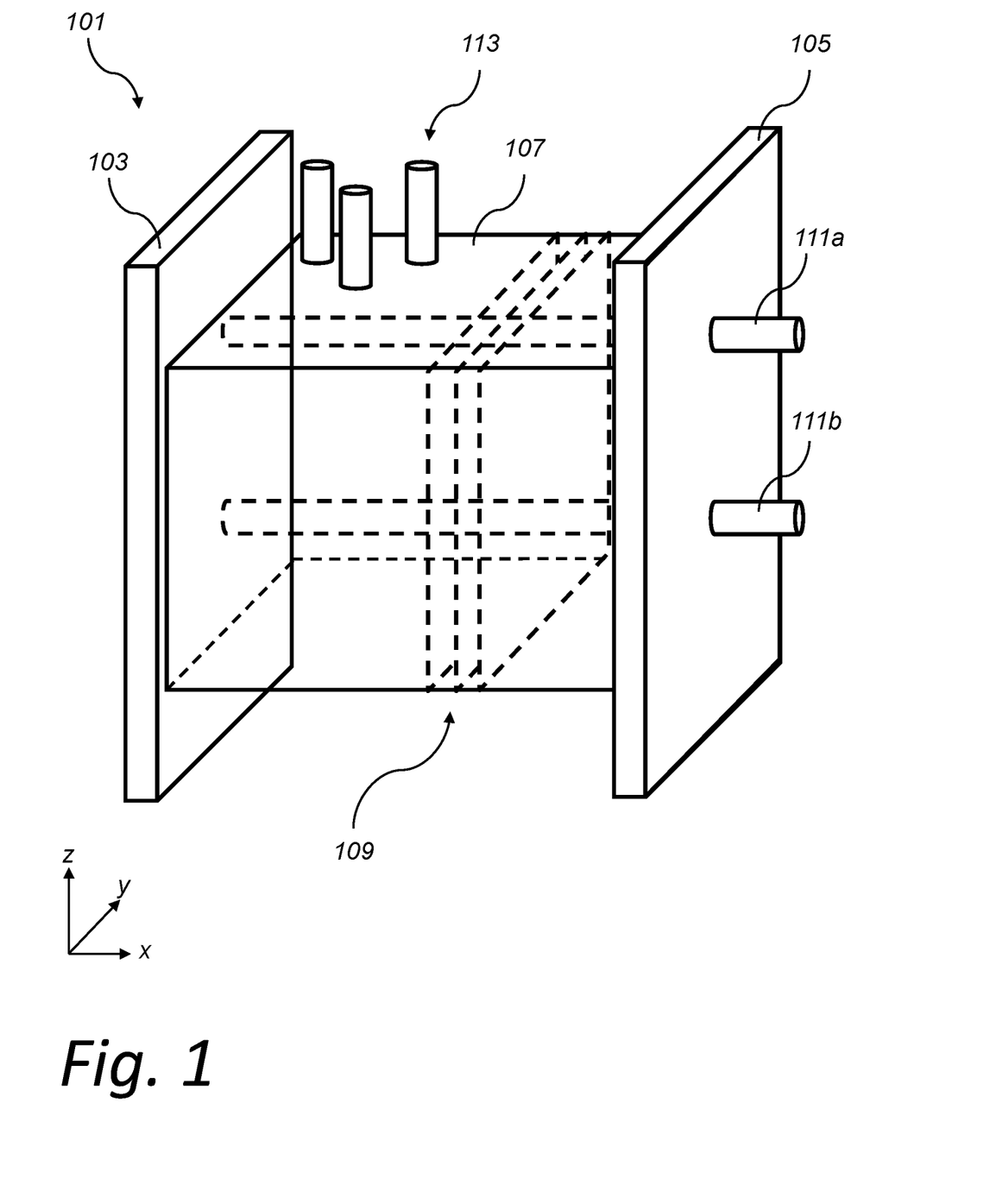
FIG. 1 is a perspective view of an alkaline electrolyzer unit used in accordance with example embodiments of the invention.

FIG. 1 schematically shows an alkaline electrolyzer unit 101 for producing hydrogen gas. The alkaline electrolyzer unit 101 may be used as any or all of the alkaline electrolyzer units explained in the following.

The alkaline electrolyzer unit 101 comprises a first end plate 103, a second end plate 105, and a cell stack 107 arranged between the first and second end plates 103, 105. The cell stack 107 is formed of a plurality of electrolyzer cells 109, of which only three are schematically shown in FIG. 1. However, the cell stack 107 typically comprises more electrolyzer cells, e.g. between 50 and 700 electrolyzer cells, typically between 150 and 500 electrolyzer cells. A typical electrolyzer cell is described below with reference to FIG. 2. The alkaline electrolyzer unit 101 further comprises two connecting rods 111a, 111b arranged to extend from the first end plate 103 to the second end plate 105, to compress the electrolyzer cells 109 in the cell stack 107. The two connecting rods 111a, 111b of FIG. 1 are shown as partly dashed as they are extending through the cell stack 107. The connecting rods 111a, 111b may e.g. be attached to each one of the first and second end plates 103, 107 by means of nuts or screw-nuts (not shown).

The cell stack 107 of the alkaline electrolyzer unit 101 in FIG. 1 is connecting to piping 113 for transporting produced gases from the cell stack 107, and/or for transporting an alkaline electrolyte and/or water to and/or from the cell stack 107.

Figure 2:
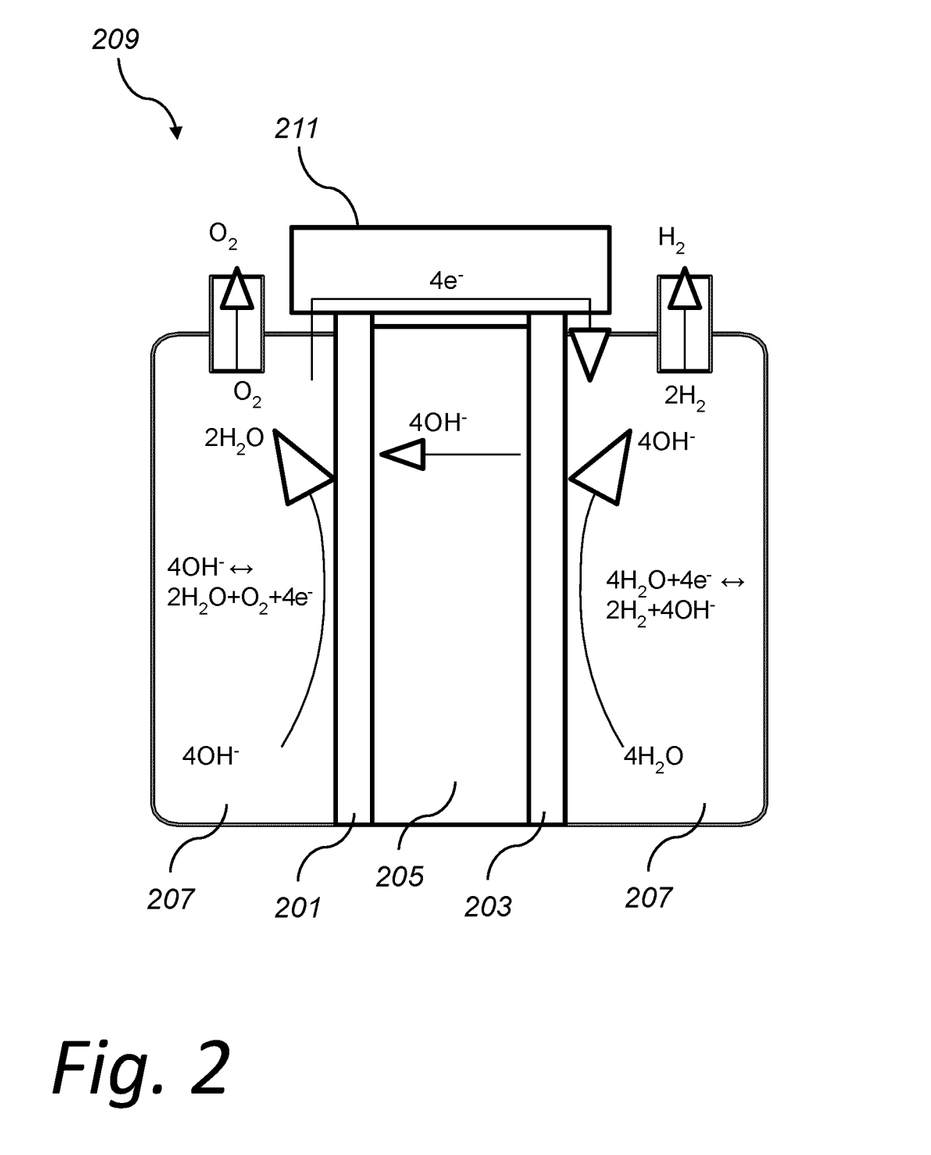
FIG. 2 is a schematic view of an electrolyzer cell used in the alkaline electrolyzer units in accordance with example embodiments of the invention, FIG. 3 schematically illustrates a robot operating on a first and second alkaline electrolyzer units in accordance with at least one example embodiment of the invention, FIG. 4 schematically illustrates a top view of a hydrogen producing plant and an industrial robot system of such hydrogen producing plant in accordance with example embodiments of the invention.

FIG. 2 schematically shows an electrolyzer cell 209. The electrolyzer cell 209 of FIG. 2 may be used for each one of the plurality of electrolyzer cells 109 of the cell stack 107 of FIG. 1. The electrolyzer cell 209 comprises a first electrolyzer electrode 201 being an anode 201, and a second electrolyzer electrode 203 being a cathode 203. The anode 201 and the cathode 203 are separate by an electrolyzer membrane 205. The anode 201 and the cathode 203 are operating in a liquid alkaline electrolyte solution 207, hereafter simply referred to as an alkaline electrolyte 207, to achieve water electrolysis. In use, oxygen gas and water are produced at the anode 201 by means of anions of OH, and hydrogen gas and anions of OH are produced at the cathode 203 by means of supplied electrons, as indicated in FIG. 2. The electrons are transferred from the anode side to the cathode side by means of an electron transfer bridge 211. The anions of OH is transported from the cathode 203 to the anode 201 via the electrolyzer membrane 205. The cell stack 107 of the alkaline electrolyzer unit 101 of FIG. 1 typically comprises a plurality of such electrolyzer cells 209.

Figure 3:
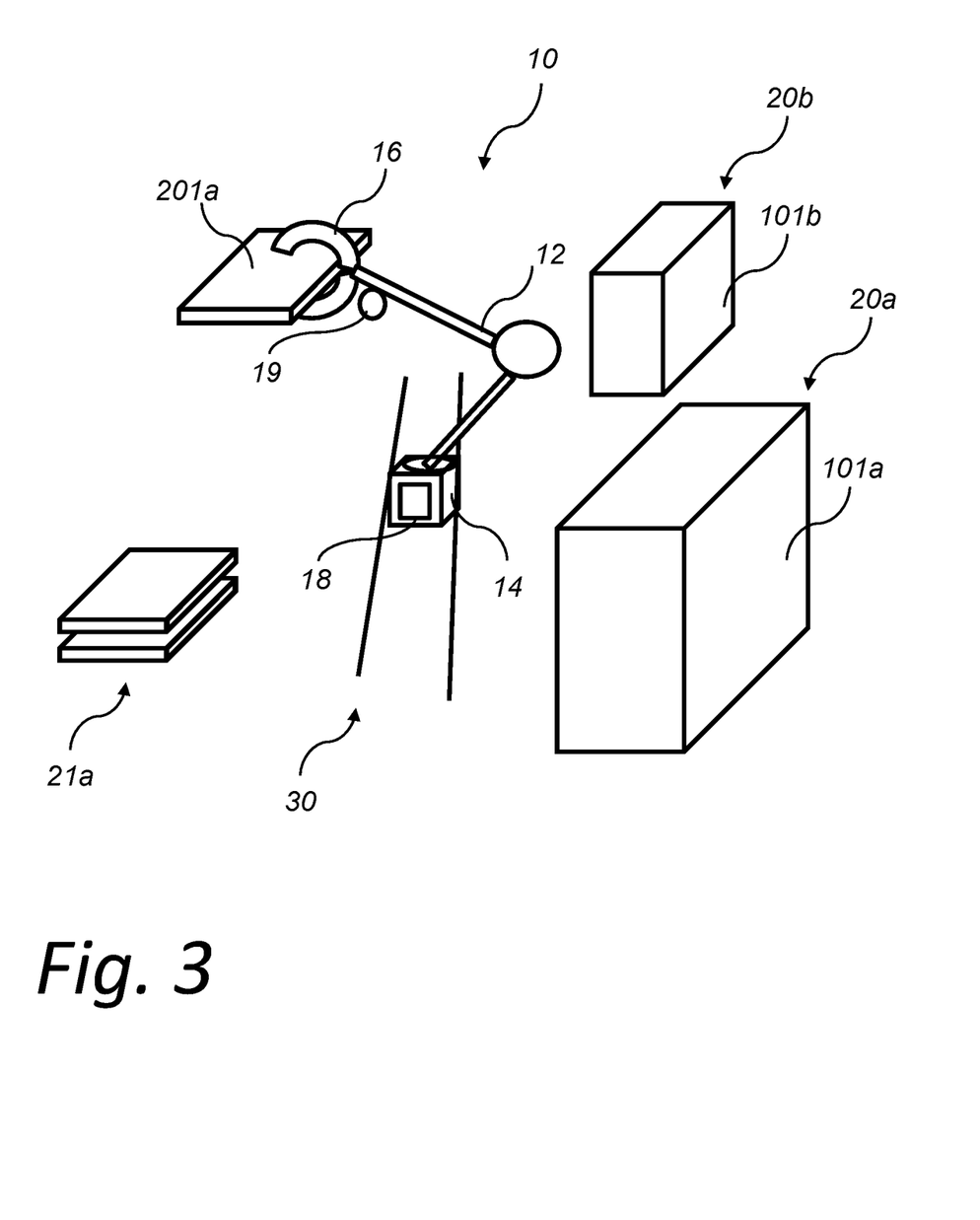

FIG. 3 is a perspective view of a robot 10 configured to assemble and disassemble alkaline electrolyzer units 101a, 101b at a respective electrolyzer unit site 20a, 20b. The alkaline electrolyzer units 101a, 101b are only schematically illustrated in FIG. 3, but each one typically corresponds to the alkaline electrolyzer unit 101 of FIG. 1. Thus, each one of the alkaline electrolyzer units 101a, 101b comprises a first and second end plates, a cell stack arranged between the first and second end plates, and at least one connecting rod. Furthermore, each one of the alkaline electrolyzer units 101a, 101b is typically connecting to piping, as described with reference to FIG. 1. Moreover, the robot 10 may comprise a gas sensor 19 configured to detect any leaking gas from the alkaline electrolyzer units 101a, 101b. The robot 10 of FIG. 3 is typically used in the industrial robot system described with reference to FIG. 4.

The robot 10 comprises a manipulator 12 with a base 14, and a tool 16 movable by means of the manipulator 12 in relation to the base 14 about a plurality of axes. The robot 10 is configured to be transported to the electrolyzer unit sites 20a, 20b on a rail system 30 (described in more detail with reference to FIG. 4). The robot 10 of FIG. 3 is operated by executing instructions comprised in a controller 18. In FIG. 3, the controller 18 is integrated into the base 14 of the robot 10, but it may as well be located externally of the robot 10. The robot 10 may e.g. be an IRB 660 Robot from ABB, or adapted version thereof.

In more detail, the controller 18 is configured to perform at least primary control of the robot 10, and specifically motion control of the manipulator 12 and tool 16, as well as processing in relation to these activities. However, in addition to the controller 18, the robot 10 may be operated by means of one or more further controller entities, referred to as secondary controllers (being e.g. robot cell controller and/or an edge/line controller).

The robot 10 is configured to assemble a first alkaline electrolyzer unit 101a at a first electrolyzer unit site 20a by executing assembly instructions comprised in the controller 18, such that a plurality of electrolyzer electrodes (shown in FIG. 2) and a plurality of electrolyzer membranes (shown in FIG. 2) are arranged in electrolyzer cells forming the cell stack (shown in FIG. 1) by using the tool 16 and manipulator 12 of the robot 10.

The robot 10 is also configured to, by means of the tool 16 and manipulator 12, disassemble a second alkaline electrolyzer unit 101b at a second electrolyzer unit site 20b by executing disassembly instructions comprised in the controller 18, such that at least one alkaline electrolyzer unit component 201a is removed from the second alkaline electrolyzer unit 101b by using the tool 16 and manipulator 12. In the example embodiment of FIG. 3, the robot 10 moves the alkaline electrolyzer unit component 201a, e.g. being an electrolyzer electrode 201a from the second alkaline electrolyzer unit 101b to a local storage position 21a. During such disassemble of the second alkaline electrolyzer unit 101b, the first alkaline electrolyzer unit 101a may be operating to produced hydrogen gas.

Figure 4:
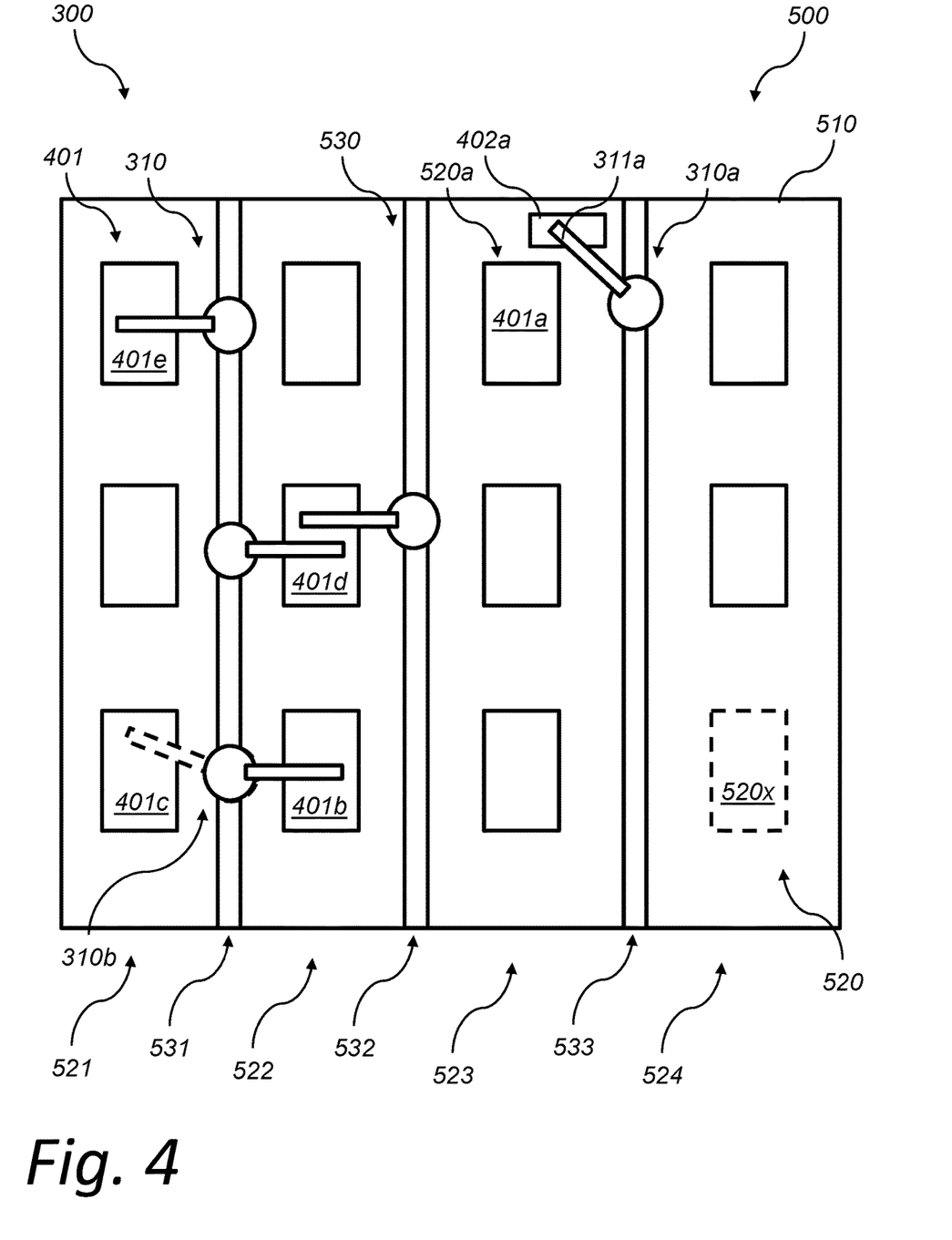

FIG. 4 is a schematical top view of an industrial robot system 300 for assembling and/or disassembling alkaline electrolyzer units 401 of a hydrogen producing plant 500. Each one of the alkaline electrolyzer units 401 may be the same as the alkaline electrolyzer unit 101 of FIG. 1. Thus, each one of the alkaline electrolyzer units 401 comprises alkaline electrolyzer unit components including at least a plurality of electrolyzer electrodes and a plurality of electrolyzer membranes forming electrolyzer cells in a cell stack, first and second end plates wherein the cell stack is arranged between the first and second end plates, and at least one connecting rod. Furthermore, each one of the alkaline electrolyzer units 401 is typically connecting to piping, as described with reference to FIG. 1.

The hydrogen producing plant 500 is housed in a building 510 with a controlled in-house environment. Due to the risk of leaking gases from the alkaline electrolyzer units 401, the controlled in-house environment may be a classified area by IEC/EN 60079-10, IEC 60079-10-1, IEC 60079-10-2, or IECEx. The hydrogen producing plant 500 further comprises a rail system 530, e.g. corresponding to the rail system 30 of FIG. 3, but another guiding system for the industrial robot system 300 is conceivable. The industrial robot system 300 comprises a plurality of robots 310, where each robot e.g. corresponds to the robot 10 of FIG. 3. That is, each robot may comprise a manipulator with a base, and a tool movable by means of the manipulator in relation to the base about a plurality of axes (not shown separately in FIG. 4). The plurality of robots 310 is operated by executing instructions comprised in a controller which may be integrated into the respective base of the robots 310. The plurality of robots 310 is configured to be transported to a plurality of electrolyzer unit sites 520 on the rail system 530. Some of the alkaline electrolyzer units 401, the plurality of robots 310, the electrolyzer unit sits 520 are referred to separately by using suffixes such as "a", "b", "c" etc.

Correspondingly to the described configuration of the robot 10 of FIG. 3, the plurality of robots 310 is configured to assemble the alkaline electrolyzer units 401 at the electrolyzer unit sites 520 by executing assembly instructions comprised in the controller. Thus, for each assembled alkaline electrolyzer unit 401, a plurality of electrolyzer electrodes and a plurality of electrolyzer membranes are arranged in electrolyzer cells forming a cell stack by using the tool and manipulator of at least one robot 310. Moreover, the plurality of robots 310 is configured to, by means of the tools and manipulators of the robots 310, disassemble the alkaline electrolyzer units 401 by executing disassembly instructions comprised in the controller.

For example, as shown in FIG. 4, a first alkaline electrolyzer unit 401a at a first electrolyzer unit site 520a is being disassembled by a first robot 310a, e.g. for maintenance. Thus, for the disassembled alkaline electrolyzer unit 401a, at least one alkaline electrolyzer unit component 402a is removed from the first alkaline electrolyzer unit 401a by using the tool and manipulator, commonly indicated by reference numeral 311a of the first robot 310a. As shown in FIG. 4, a plurality of other alkaline electrolyzer units 401b, 401c, 401d, 401e are being assembled by the robots 310, while another plurality of alkaline electrolyzer units 401 (not indicated separately) are already assembled. At one electrolyzer unit site 520x, no alkaline electrolyzer unit is yet assembled. Thus, this is an intended electrolyzer unit site.

Figure 5:
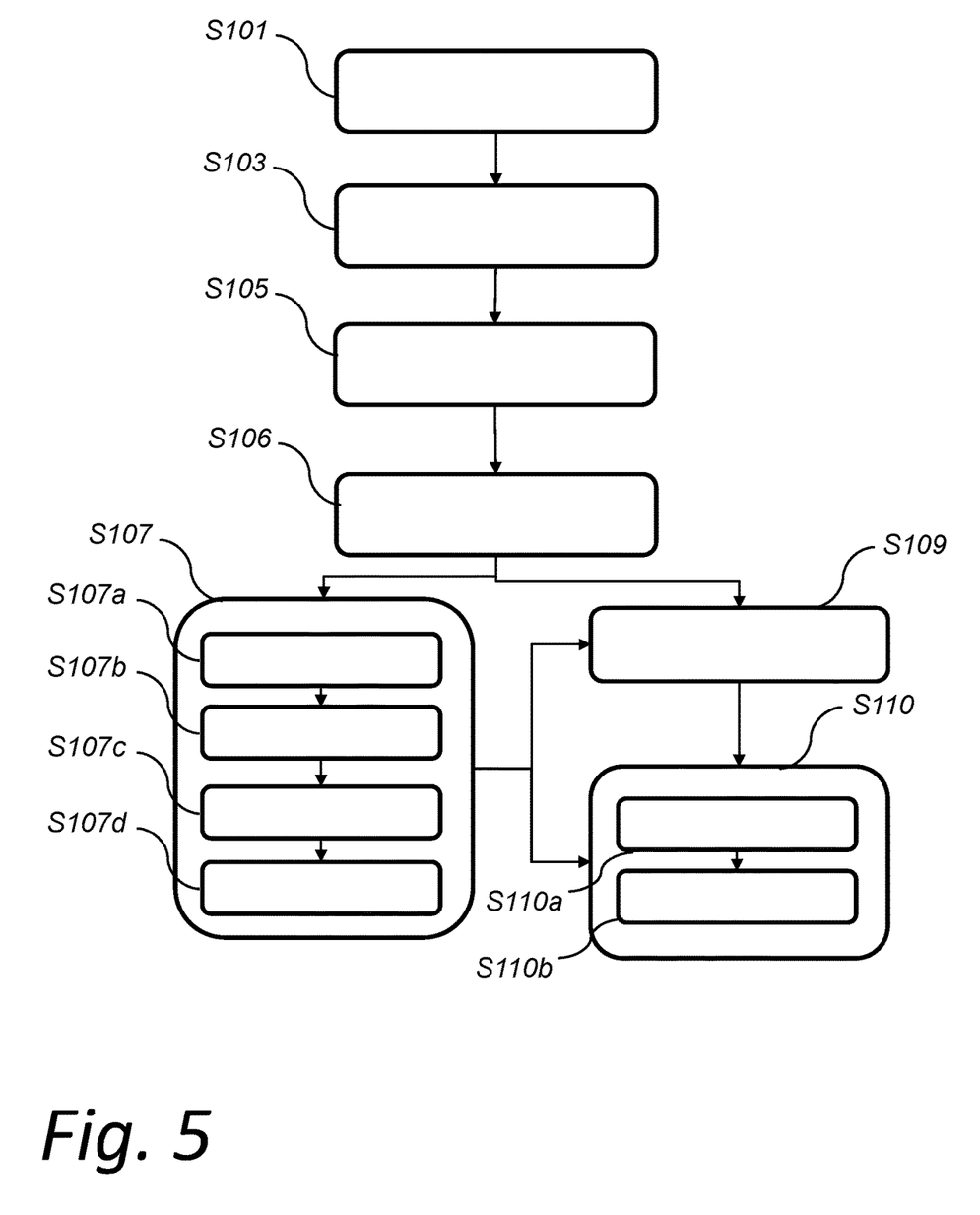
FIG. 5 is a flow-chart describing the steps of a method for assembling and/or disassembling alkaline electrolyzer units of a hydrogen producing plant in accordance with example embodiments of the invention.

The invention will now be described with reference to the flow chart in FIG. 5, partly with further reference to at least the industrial robot system 300 and hydrogen producing plant 500 of FIG. 4. The flow chart schematically illustrates the steps of a method for assembling and/or disassembling alkaline electrolyzer units of a hydrogen producing plant, as the hydrogen producing plant 500 of FIG. 4. Thus, the hydrogen producing plant is housed in a building with a controlled in-house environment and comprises a guiding system, such as e.g. a rail system.

In a step S101, an industrial robot system comprising a controller having robot functionality, and a plurality of robots is provided. Each robot in the plurality of robots comprises a manipulator with a base, and a tool movable by means of the manipulator in relation to the base about a plurality of axes. Thus, the industrial robot system may be the same industrial robot system 300 described with reference to FIG. 4, and each robot in the industrial robot system 300 may be the robot 10 described with reference to FIG. 3.

In a step S103, the plurality of robots is transported to a plurality of electrolyzer unit sites. The robots are typically transported by the guiding system, e.g. being a rail system as the rail system 30 of FIG. 4, or rather the rail system 530 of FIG. 4.

In a step S105, alkaline electrolyzer unit components including at least a plurality of electrolyzer electrodes and a plurality of electrolyzer membranes are provided. As described with reference to the alkaline electrolyzer unit 101 of FIG. 1, the alkaline electrolyzer unit components typically also include first and second end plates and connecting rods. Furthermore, as each one of the alkaline electrolyzer units typically is connecting to piping, the alkaline electrolyzer unit components may furthermore include piping. In a step S106, the alkaline electrolyzer unit components are transported, e.g. on the rail system, to, or from, the plurality of electrolyzer unit sites.

In a step S107, the alkaline electrolyzer units are assembled at the electrolyzer unit sites by the plurality of robots executing assembly instructions comprised in the controller. The assembling comprises, for each assembled alkaline electrolyzer unit, arranging S107a the plurality of electrolyzer electrodes and the plurality of electrolyzer membranes in electrolyzer cells forming a cell stack by means of the tool and manipulator of at least one robot, e.g. as described with reference to FIG. 4.

As the alkaline electrolyzer unit components may include end plates as previously described, the step S107 may comprise, for each assembled alkaline electrolyzer unit, arranging S107b the end plates as a first end plate and a second end plate with the cell stack arranged between the first and second end plates.

Correspondingly, as the alkaline electrolyzer unit components may include connecting rods as previously described, the step S107 may comprise, for each assembled alkaline electrolyzer unit, arranging S107c at least one connecting rod to extend from the first end plate to the second end plate to compress the electrolyzer cells in the cell stack.

Correspondingly, as the alkaline electrolyzer unit components may include piping as previously described, the step S107 may comprise, for each assembled alkaline electrolyzer unit, arranging S107d the piping to transport produced gas from the electrolyzer cells of the cell stack.

Typically, the guiding system, such as the rail system, is arranged such that the plurality or robots are transported S103 to the plurality of electrolyzer unit sites in a plurality of rows. Two neighbouring rows are typically separated by a rail portion of the rail system. Thus, the step S107 of assembling the alkaline electrolyzer units at the electrolyzer unit sites by the plurality of robots may be performed to achieve corresponding rows of alkaline electrolyzer units. Turning back briefly to FIG. 4, this is shown as a first row 521 of electrolyzer unit sites 520 is separated from a second row 522 of electrolyzer units sites 520 by a first rail portion 531, and wherein the second row 522 of electrolyzer units sites 520 is separated from a third row 523 of electrolyzer unit sites 520 by a second rail portion 532, and wherein the third row 523 of electrolyzer unit sites 520 is separated from a fourth row 524 of electrolyzer unit sites 520 by a third rail portion 533. Preferably, the row spacing is small enough such that a robot 310, e.g. a second robot 310b positioned at the first rail portion 531 in between two neighbouring rows 521, 522, may operate on alkaline electrolyzer units 401b, 401c in both rows 521, 522 while remaining in the same position relative the rail portion 531. Hereby, the step S107 of assembling may comprise assembling an alkaline electrolyzer unit 401*c* in the first row 521, and assembling an alkaline electrolyzer unit 401*b* in the second row 522 by at least one robot 310*b*.

In a step S109, which may be performed prior, simultaneously, subsequently, or instead of, step S107, at least one of the alkaline electrolyzer units is disassembled at an electrolyzer unit site by at least one of the plurality of robots executing disassembly instructions comprised in the controller. The disassembling comprises, for each disassembled alkaline electrolyzer unit, removing at least one alkaline electrolyzer unit component by means of the tool and manipulator of at least one robot, e.g. as described with reference to FIG. 4.

The step S107 of assembling may furthermore comprise, for each robot, moving the manipulator to a local storage position of the alkaline electrolyzer unit components, picking up an alkaline electrolyzer unit component using the tool, moving the manipulator with the tool holding the picked-up alkaline electrolyzer unit component to an installation position of the associated electrolyzer unit site, assemble the alkaline electrolyzer unit component for the associated alkaline electrolyzer unit.

Correspondingly, the step S109 of disassembling may comprise, for each robot, moving the manipulator to the associated alkaline electrolyzer unit, picking up an alkaline electrolyzer unit component using the tool, moving the manipulator with the tool holding the picked-up alkaline electrolyzer unit component to a local storage position of the alkaline electrolyzer unit components, releasing the alkaline electrolyzer unit component at the local storage position of the alkaline electrolyzer unit components. This is e.g. shown in FIG. 3, wherein the robot 10 moves the alkaline electrolyzer unit component 201*a* to the local storage position 21*a*.

In a step S111, a gas sensor configured to detect any leaking gas from the alkaline electrolyzer units is provided. The gas sensor may e.g. be provided on the plurality of robots, as shown e.g. in FIG. 3.

During the step S107 of assembling and/or the step S109 of disassembling, at least two robots may be operated S110 by a collaborative motion to collaboratively perform assembling S107 and/or disassembling S109 of a particular alkaline electrolyzer unit. In more detail, the step S107 and/or the step S109 may comprise operating S110*a* a first robot of the plurality of robots with a primary robot functionality by the controller, the primary robot functionality including control of manipulator motion, and operating S110*b* a second robot of the plurality of robots with the primary robot functionality by the controller such that the first and second robots are operated by a collaborative motion of the first and second manipulators to collaboratively perform assembling and/or disassembling of a particular alkaline electrolyzer unit. The two robot operating steps S110*a*, S110*b* may according to one example embodiment be performed to achieve synchronized motion of the first and second manipulators.

The step S109 of disassembling, may be performed while a plurality of other alkaline electrolyzer units is operating in the hydrogen producing plant. Thus, disassembling S109, e.g. for maintenance, may be performed during operation of the hydrogen producing plant. Prior to such step S109 of disassembling, the particular alkaline electrolyzer unit subject to the disassembling may be prepared for the disassembly and/or maintenance. For example, the method comprises performing necessary actions like opening/closing valves; opening electrical circuits and applying necessary grounding equipment to the electrical system in such way that other alkaline electrolyzer unit can continue to operate.

While the invention has been described in connection with what is presently considered to be most practical and preferred embodiments, it is to be understood that the invention is not to be limited to the disclosed embodiments, but on the contrary, is intended to cover various modifications and equivalent arrangements. For example, the guiding system is in the detailed description of example embodiments mainly described as a rail system housed in the building. However, the guiding system may comprise another means for transporting the plurality of robots within the building, e.g. by an autonomous mobile robot functionality as previously mentioned. Thus, each one of the plurality of robots may be an autonomous mobile robot (AMR) configured to move inside the building by positioning information. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for assembling alkaline electrolyzer units of a hydrogen producing plant, the hydrogen producing plant being housed in a building with a controlled inhouse environment, the method comprising:
providing an industrial robot system comprising a controller having robot functionality, and a plurality of robots, each robot comprising a manipulator with a base, and a tool movable by means of the manipulator in relation to the base about a plurality of axes,
transporting the plurality of robots to a plurality of electrolyzer unit sites, the plurality of electrolyzer unit sites being provided in a plurality of rows, wherein two neighboring rows are separated by a row space, such that a first robot is positioned in between a first row and a second row,
providing alkaline electrolyzer unit components including at least a plurality of electrolyzer electrodes and a plurality of electrolyzer membranes,
assembling the alkaline electrolyzer units at the electrolyzer unit sites by the plurality of robots executing assembly instructions comprised in the controller, wherein assembling comprises, for each assembled alkaline electrolyzer unit, arranging the plurality of electrolyzer electrodes and the plurality of electrolyzer membranes in electrolyzer cells forming a cell stack by means of the tool and the manipulator of at least one robot, and wherein assembling comprises assembling a first alkaline electrolyzer unit in the first row, and assembling a second alkaline electrolyzer unit in the second row by the first robot.

2. The method according to claim 1, wherein the alkaline electrolyzer unit components further include end plates, and wherein assembling further comprises, for each assembled alkaline electrolyzer unit, arranging the end plates as a first end plate and a second end plate with the cell stack arranged between the first and second end plates.

3. The method according to claim 2, wherein the alkaline electrolyzer unit components further include connecting rods, and wherein assembling further comprises, for each assembled alkaline electrolyzer unit, arranging at least one connecting rod to extend from the first end plate to the second end plate to compress the electrolyzer cells in the cell stack.

4. The method according to claim 1, wherein the alkaline electrolyzer unit components further include piping, and wherein assembling further comprises, for each assembled alkaline electrolyzer unit, arranging the piping to transport produced gas from the electrolyzer cells of the cell stack.

5. The method according to claim 1, wherein assembling comprises, for each robot, moving the manipulator to a local storage position of the alkaline electrolyzer unit components, picking up an alkaline electrolyzer unit component using the tool, moving the manipulator with the tool holding the picked-up alkaline electrolyzer unit component to an installation position of the associated electrolyzer unit site, assemble the alkaline electrolyzer unit component for the associated alkaline electrolyzer unit.

6. The method according to claim 1, further comprises providing a gas sensor configured to detect any leaking gas from the alkaline electrolyzer units.

7. A method for assembling alkaline electrolyzer units of a hydrogen producing plant, the hydrogen producing plant being housed in a building with a controlled inhouse environment, the method comprising:
   providing an industrial robot system comprising a controller having robot functionality, and a plurality of robots, each robot comprising a manipulator with a base, and a tool movable by means of the manipulator in relation to the base about a plurality of axes,
   transporting the plurality of robots to a plurality of electrolyzer unit sites, the plurality of electrolyzer unit sites being provided in a plurality of rows, wherein two neighboring rows are separated by a row space, such that a first robot is positioned in between a first row and a second row,
   providing alkaline electrolyzer unit components including at least a plurality of electrolyzer electrodes and a plurality of electrolyzer membranes,
   assembling the alkaline electrolyzer units at the electrolyzer unit sites by the plurality of robots executing assembly instructions comprised in the controller, wherein assembling comprises, for each assembled alkaline electrolyzer unit, arranging the plurality of electrolyzer electrodes and the plurality of electrolyzer membranes in electrolyzer cells forming a cell stack by means of the tool and the manipulator of at least one robot, and wherein assembling comprises assembling a first alkaline electrolyzer unit in the first row, and assembling a second alkaline electrolyzer unit in the second row by the first robot,
   operating the first robot with a primary robot functionality by the controller, the primary robot functionality including control of manipulator motion, and
   operating a second robot of the plurality of robots with the primary robot functionality by the controller such that the first and second robots are operated by a collaborative motion of the first and second manipulators to collaboratively perform assembling of a particular alkaline electrolyzer unit.

8. The method according to claim 7, further comprising:
   operating the first and second robots by synchronized motion of the first and second manipulators.

9. The method according to claim 1, further comprises transporting the alkaline electrolyzer unit components to, or from, the plurality of electrolyzer unit sites.

10. The method according to claim 1, wherein the controlled inhouse environment is a classified area by IEC/EN 60079-10, IEC 60079-10-1, IEC 60079-10-2, or IECEx.

11. The method according to claim 1, wherein the first robot can rotate between a first position in which the robot operates on the first alkaline electrolyzer in the first row, and a second position in which the robot operates on the second alkaline electrolyzer in the second row.

12. The method according to claim 2, wherein the alkaline electrolyzer unit components further include piping, and wherein assembling further comprises, for each assembled alkaline electrolyzer unit, arranging the piping to transport produced gas from the electrolyzer cells of the cell stack.

13. The method according to claim 2, wherein assembling comprises, for each robot, moving the manipulator to a local storage position of the alkaline electrolyzer unit components, picking up an alkaline electrolyzer unit component using the tool, moving the manipulator with the tool holding the picked-up alkaline electrolyzer unit component to an installation position of the associated electrolyzer unit site, assemble the alkaline electrolyzer unit component for the associated alkaline electrolyzer unit.

14. The method according to claim 2, further comprises providing a gas sensor configured to detect any leaking gas from the alkaline electrolyzer units.

15. The method according to claim 2, further comprising:
   operating the first robot with a primary robot functionality by the controller, the primary robot functionality including control of manipulator motion,
   operating a second robot of the plurality of robots with the primary robot functionality by the controller such that the first and second robots are operated by a collaborative motion of the first and second manipulators to collaboratively perform assembling of a particular alkaline electrolyzer unit.

* * * * *